US006286003B1

(12) United States Patent
Muta

(10) Patent No.: US 6,286,003 B1
(45) Date of Patent: Sep. 4, 2001

(54) REMOTE CONTROLLING METHOD A NETWORK SERVER REMOTE CONTROLLED BY A TERMINAL AND A MEMORY STORAGE MEDIUM FOR HTML FILES

(75) Inventor: Hidemasa Muta, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/063,077

(22) Filed: Apr. 21, 1998

(30) Foreign Application Priority Data

Apr. 22, 1997 (JP) .................................................... 9-104997

(51) Int. Cl.[7] ...................................................... G06F 17/30
(52) U.S. Cl. ............................ 707/10; 709/203; 709/208; 345/326
(58) Field of Search ............................ 707/10, 102, 104, 707/513; 395/712, 200.33, 200.39; 709/203, 208; 345/113, 326, 501, 504, 520, 522, 440, 435

(56) References Cited

U.S. PATENT DOCUMENTS

| | | | |
|---|---|---|---|
| 5,005,122 | * 4/1991 | Griffin et al. | 709/203 |
| 5,706,502 | * 1/1998 | Foley et al. | 707/10 |
| 5,909,545 | * 6/1999 | Frese et al. | 709/208 |
| 5,974,441 | * 10/1999 | Rogers et al. | 707/513 |
| 6,098,092 | * 8/2000 | Padzensky | 709/203 |

FOREIGN PATENT DOCUMENTS

| | | | |
|---|---|---|---|
| 645726A | 3/1995 | (EP) | G06F/17/60 |
| 7028736 | 1/1995 | (JP) | G06F/13/00 |

OTHER PUBLICATIONS

Jamie Jaworski, JAVA 1.1 Developer's Guide, pp. 124–130 and 330–342, Jan. 1997*
NetSupport Manager Remote Control Software, http//:www.deski.com/nsm/index.html, p. 1–15, Nov. 1999.*
Mike Fratto: "Remote Control: Let your Browser Do the Walking", Network Computing, Jan. 15, 1998, Available on the Internet on Sep. 3, 1998.
Edward Steinfeld: "Leveraging Browser As Universal GUIs", Electronic Engineering Times, Dec. 16, 1996, Issue: 932. UDS, Available in the Internet on Sep. 3, 1998.
Steven Houtchens: "HTTP Java provide run–time control", Electronic Engineering Times. Nov. 4,1996, Issue: 926.
"Remote System Console Without a Remote Emulator Program" IBM Technical Disclosure Bulletin, vol. 34, No. 4B, Sep. 1, 1991, pp. 383–386, XP000189607.

* cited by examiner

Primary Examiner—Jean R. Homere
Assistant Examiner—Greta L. Robinson
(74) Attorney, Agent, or Firm—A. Bruce Clay; Myers, Bigel, Sibley & Sajovec, P.A.

(57) ABSTRACT

Control of a GUI screen at a server in a remote location is obtained without requiring the prior installment of special remote controlling software in a remote controlling machine. Remote controlling software is described in an HTML (HyperText Markup Language) file that is held by the server, and a remote controlling machine downloads it using a web browser. The downloaded remote controlling software is automatically activated and sends a request for the activation of remotely controlled software that is present in a remotely controlled server. The remote controlling machine then activates an event monitor, an event sender, a drawing command receiver and a drawing command analyzer, which are functions of the remote controlling software.

9 Claims, 16 Drawing Sheets

FIG. 5

```
<HTML>

<HEAD>
<TITLE>Hidemasa Muta's office machine</TITLE>
</HEAD>

<BODY BGCOLOR="#ffffff">

<IMG SRC="header.gif">
<HR>                    271
<APPLET CODE="master.class" WIDTH=640 HEIGHT=480>
<P>Your WWW browser does not support Java applet!</P>
</APPLET>

</BODY>

</HTML>
```

Example event data

| 8 bits | 8 bits | 8 bits | 8 bits |
|---|---|---|---|
| Start operation | | | |
| Activate mouse | | | |
| Move mouse | X coordinate | Y coordinate | |
| Move mouse | X coordinate | Y coordinate | |
| Move mouse | X coordinate | Y coordinate | |
| Press mouse | | | |
| Release mouse | | | |
| Press mouse | | | |
| Release mouse | | | |
| Press key | Key code | | |
| Release Key | Key code | | |
| Move mouse | X coordinate | Y coordinate | |
| Deactivate mouse | | | |
| Activate mouse | | | |
| Move mouse | X coordinate | Y coordinate | |
| Press mouse | | | |
| Drag mouse | X coordinate | Y coordinate | |
| Drag mouse | X coordinate | Y coordinate | |
| Release mouse | | | |
| Stop operation | | | |

FIG. 20

Example drawing command data

| | 8 bits | 8 bits | 8 bits | 8 bits | 8 bits | 8 bits | 8 bits | 8 bits | 8 bits | 8 bits |
|---|---|---|---|---|---|---|---|---|---|---|
| Line | Start point X | Start point Y | End point X | End point Y | Foreground color | | | | | |
| XOR line | Start point X | Start point Y | End point X | End point Y | | | | | | |
| Rectangle | X coordinate | Y coordinate | Width | Height | Foreground color | | | | | |
| XOR rectangle | X coordinate | Y coordinate | Width | Height | | | | | | |
| Screen copy | Original X | Original Y | Target X | Target Y | Width | Height | | | | |
| 1 bit/pixel image | X coordinate | Y coordinate | Width | Height | Foreground color | Background color | Image data | | | |
| 1 bit/pixel transparent image | X coordinate | Y coordinate | Width | Height | Foreground color | Image data | | | | |
| 1 bit/pixel XOR image | X coordinate | Y coordinate | Width | Height | Image data | | | | | |
| 4 bit/pixel image | X coordinate | Y coordinate | Width | Height | Image data | | | | | |
| 4 bit/pixel XOR image | X coordinate | Y coordinate | Width | Height | Image data | | | | | |
| 8 bit/pixel image | X coordinate | Y coordinate | Width | Height | Image data | | | | | |
| 8 bit/pixel XOR image | X coordinate | Y coordinate | Width | Height | Image data | | | | | |
| 24 bit/pixel image | X coordinate | Y coordinate | Width | Height | Image data | | | | | |
| 24 bit/pixel XOR image | X coordinate | Y coordinate | Width | Height | Image data | | | | | |

REMOTE CONTROLLING METHOD A NETWORK SERVER REMOTE CONTROLLED BY A TERMINAL AND A MEMORY STORAGE MEDIUM FOR HTML FILES

TECHNICAL FIELD OF THE INVENTION

The present invention relates to a remote controlling method, and in particular to a method for controlling a GUI (Graphical User Interface) screen at a remotely controlled machine on a network.

BACKGROUND OF THE INVENTION

Conventionally, when controlling a GUI screen at a machine in a remote location, special remote controlling software must be installed in advance on both machines.

Many of the currently available remote controlling machines are designed for operation in a variety of machine and software environments. Some machines run under different Operating Systems. Therefore, a great expenditure of effort is required to develop remote controlling software and to install it on all these machines.

In addition, since the same software versions must be installed on remotely controlled machines and the machines that exercise the remote control, a great expenditure of effort is also required to manage these machines. For example, before installing an upgrade version, the versions on all the remote controlling machines must be examined.

If remote controlling software is developed for specific platforms, the use of the software is necessarily limited to those platforms for which it is developed, and the multi-platform operations that users demand can not be implemented.

When remote controlling software is routinely installed in remote controlling machines a certain amount of memory must be permanently allocated for its storage which constitutes a barrier to the downsizing of portable remote controlling machines.

Japanese Examined Patent Publication No. Hei 8-1624 and Japanese Examined Patent Publication No. Hei 7-34188 are prior art related to the present invention. Japanese Patent Examined Publication No. Hei 8-1624 disclosed a technique whereby not only can a program run on different OSs, but also GUI sources are collectively displayed on a screen of a computer system at a remote location. Japanese Examined Patent Publication No. Hei 7-34188 discloses a computer system for supporting multi-graphics sessions comprising a central processor, a graphic terminal and a display controller processor at a remote area. These conventional techniques, however, do not resolve the above described problems because they involve the prior introduction of remote controlling software into remote controlling machines.

SUMMARY OF THE INVENTION

It is, therefore, one objective of the present invention to provide a computer system wherein, even when no remote controlling software is currently available at a remote controlling terminal, remote controlling of a server can be effected simply by accessing it.

It is another objective of the present invention to simplify the upgrading operation, for remote controlling software held by a remote controlling terminal, that accompanies the upgrading of the version of the remote controlling software held by a server that is to be remotely controlled.

It is an additional objective of the present invention to eliminate the installation of remote controlling software that is conventionally required for a remote controlling terminal and to reduce the load imposed on a system manager.

It is a further objective of the present invention to eliminate the management of remote controlling software that is conventionally required for a remote controlling terminal and to reduce the load imposed on a system manager.

It is still another objective of the present invention to enable a remote control operation that is not dependent on the platform provided by a remote controlling terminal.

It is a still further objective of the present invention to reduce the use of resources by a remote controlling terminal and to reduce the requirements for the hardware that can be used for a remote controlling terminal.

It is yet another objective of the present invention to provide a fast remote control system that reduces the quantity of data that is exchanged by a remote controlling machine and a remotely controlled machine during a remote control operation.

It is yet an additional object of the present invention to reduce the memory area of a remote controlling terminal and the load on a resource, such as a CPU, by employing software used for one application as special download software for downloading remote controlling software.

Control of a GUI screen at a server in a remote location is obtained while the prior installment of special remote controlling software in a remote controlling machine is not required, and remote controlling is performed by using the obtained software.

According to the present invention, remote controlling software is linked with (described in) an HTML (HyperText Markup Language) file that is held by a server, and a remote controlling machine can easily provide remote control without using special software incorporated in an arbitrary web browser which supports JAVA applet When the remote controlling software is downloaded to the remote controlling machine, it automatically activates and sends a request for the activation of remote controlled software that is present in a remotely controlled server. The remote controlling machine then activates an event monitor, an event sender, a drawing command receiver and a drawing command analyzer, which are functions of the remote controlling software.

In response to the request issued by the remote controlling machine, the remotely controlled server activates an event receiver, an event analyzer, a drawing command monitor and a drawing command sender, which are functions of the remote controller software. Thus, as is shown in FIG. 2, the same image (the slave server display area 220) as that on a display screen 245 of a slave server 240 is drawn on a web browser screen 210 at a master controller 100 (See FIG. 1), and the master controller 100 can remotely control the slave server 240.

According to a first aspect of the present invention, a method is provided for controlling a GUI resource of a server connected to a network and having remote controlling software from a terminal connected to the network and having an input device, the method comprises the steps of: (a) accessing the server through the network according to a server access information specified at the terminal; (b) downloading the remote controlling software from the server to the terminal; (c) sending, from the terminal, input information that occurs at the input device of the terminal to the server according to the downloaded remote controlling software; (d) receiving, at the server, the step input information sent from the terminal, and ordering the GUI resource to generate a drawing command according to the sent input information; (e) sending the drawing command from the server to the terminal; and (f) receiving the drawing command at the terminal.

In this claim of the present invention, "server access information specified at the terminal" involves not only information input at a keyboard, but also the concept of the selection of a plurality of server access information sets that are input in advance. Further, in this claim, "input information" includes not only signals input by a pointing device, such as a mouse, but also keyboard input and voice input.

In the above claim, "ordering the GUI resource to generate a drawing command" includes all actions involved in issuing orders having a form that drawing associated software (a window system, a Graphics engine, etc.) present in a server understands. A window message may be provided for a journal playback hook, as will be explained in the preferred embodiment of the present invention, or an order may be converted into a serial port signal that the server understands, and that is generated by a mouse, and the serial port signal may be sent to a GUI resource at the server.

According to a second aspect of the present invention, provided is a remote controlling method of controlling a GUI resource of a server connected to a network and having remote controlling software from a terminal connected to the network and having an input device and a display device, the method comprises the steps of: (a) accessing the server through the network according to server access information specified at the terminal; (b) downloading the remote controlling software from the server to the terminal; (c) sending, from the terminal, input information that occurs at the input device of the terminal to the server according to the downloaded remote controlling software; (d) receiving, at the server, the sent input information from the terminal, and analyzing the contents of the sent input information; (e) ordering, according to the analyzed contents of the input information, a drawing engine to generate a drawing command; (f) sending the drawing command from the server to the terminal; and (g) generating, at the terminal, according to the drawing command received from the server, image data to be displayed on a display screen at the terminal.

In this claim of the present invention, "generating image data" is a concept that includes not only image data used for a display on a screen, but also data before it is sent as image data to the display device.

According to a third aspect of the present invention, provided is a method of remotely controlling a GUI resource of a slave server that exists on the Internet and that includes a slave daemon, an HTTP daemon and an HTML file and a master applet linked to the HTML file, from a master controller having a web browser and including an input device and a display device, the remote controlling method comprises the steps of: (a) accessing the slave server through the Internet according to a URL designated in the web browser of the master controller; (b) downloading the HTML file from the slave server to the master controller via the HTTP daemon; (c) analyzing the HTML file at the master controller and downloading the master applet linked to the HTML file; and (d) establishing a connection between the slave daemon of the slave server and the master applet of the master controller.

According to a fourth aspect of the present invention, a server connected to a network comprises: (a) remotely controlled software including an input information receiving part, an input information analyzing part, a drawing command monitoring part and a drawing command sending part; (b) remote controlling software for interacting with the remotely controlled software, which includes an input information monitoring part, an input information sending part, a drawing command receiving part and a drawing command analyzing part; (c) an HTML file holding a description of procedures for accessing the remote controlling software; and (d) an HTTP daemon for controlling access to the HTML file from the network.

According to a fifth aspect of the present invention, a server, connected through a network to a terminal that exists on the network, comprises: (a-1) remotely controlled software including an input information receiving part, an input information analyzing part, a drawing command monitoring part and a drawing command sending part; (a-2) remote controlling software for interacting with the remotely controlled software, which includes an input information monitoring part, an input information sending part, a drawing command receiving part and a drawing command analyzing part; and (a-3) sending means for, in response to a request from the terminal that the remote controlling software be downloaded, sending the remote controlling software to the terminal.

According to a sixth aspect of the present invention, provided is a computer system, which includes a server connected to a network and a terminal connected to a network, the server comprising: (a-1) remotely controlled software including an input information receiving part, an input information analyzing part, a drawing command monitoring part and a drawing command sending part; (a-2) remote controlling software for interacting with the remotely controlled software, which includes an input information monitoring part, an input information sending part, a drawing command receiving part and a drawing command analyzing part; (a-3) an HTML file holding a description of procedures for accessing the remote controlling software; and (a-4) an HTTP daemon for controlling access to the HTML file from the network; and the terminal comprising: (b-1) a web browser for accessing the HTML file to download the remote controlling software; and (b-2) remote controlling software storage for storing the remote controlling software.

According to a seventh aspect of the present invention, provided is a computer system, which includes a server connected to a network and a terminal connected to a network, the server comprising: (a-1) remotely controlled software including an input information receiving part, an input information analyzing part, a drawing command monitoring part and a drawing command sending part; (a-2) remote controlling software for interacting with the remotely controlled software, which includes an input information monitoring part, an input information sending part, a drawing command receiving part and a drawing command analyzing part; and (a-3) sending means for, in response to a request from the terminal that the remote controlling software be downloaded, sending the remote controlling software to the terminal; and the terminal comprising: (b-1) means for requesting the server to download the remote controlling software; and (b-2) remote controlling software storage for storing the remote controlling software.

According to an eighth aspect of the present invention, a memory medium comprises: (a) remote controlling software, wherein the remote controlling software has an input information monitoring part, an input information sending part, a drawing command receiving part and a drawing command analyzing part, and interact with remotely controlled software having an input information receiving part, an input information analyzing part, a drawing command monitoring part and a drawing command sending part; and (b) an HTML file holding a description of procedures for accessing the remote controlling software.

According to a ninth aspect of the present invention, a memory medium stores an HTML file holding a description of procedures for accessing remote controlling software, which includes an input information monitoring part, an input information sending part, a drawing command receiving part and a drawing command analyzing part, and which interacts with remotely controlled software that includes an input information receiving part, an input information analyzing part, a drawing command monitoring part and a drawing command sending part.

According to a tenth aspect of the present invention, a memory medium stores software for sending to a terminal, in response to a software download request from the terminal, software that includes an input information monitoring part, an input information sending part, a drawing command receiving part and a drawing command analyzing part, and that interacts with remotely controlled software that includes an input information receiving part, an input information analyzing part, a drawing command monitoring part and a drawing command sending part.

BRIEF DESCRIPTION OF THE DRAWINGS

For a more complete understanding of the present invention and for further advantages thereof, reference is now made to the following Detailed Description, taken in conjunction with the accompanying Drawings, in which:

FIG. 5 is a diagram for explaining an example HTML document used in an embodiment of the present invention;

FIG. 18 is a diagram showing example event data according to an embodiment of the present invention;

FIG. 20 is a diagram showing example drawing command data according to an embodiment of the present invention.

DESCRIPTION OF THE PREFERRED EMBODIMENT

A. Hardware Arrangement

Figure 1:
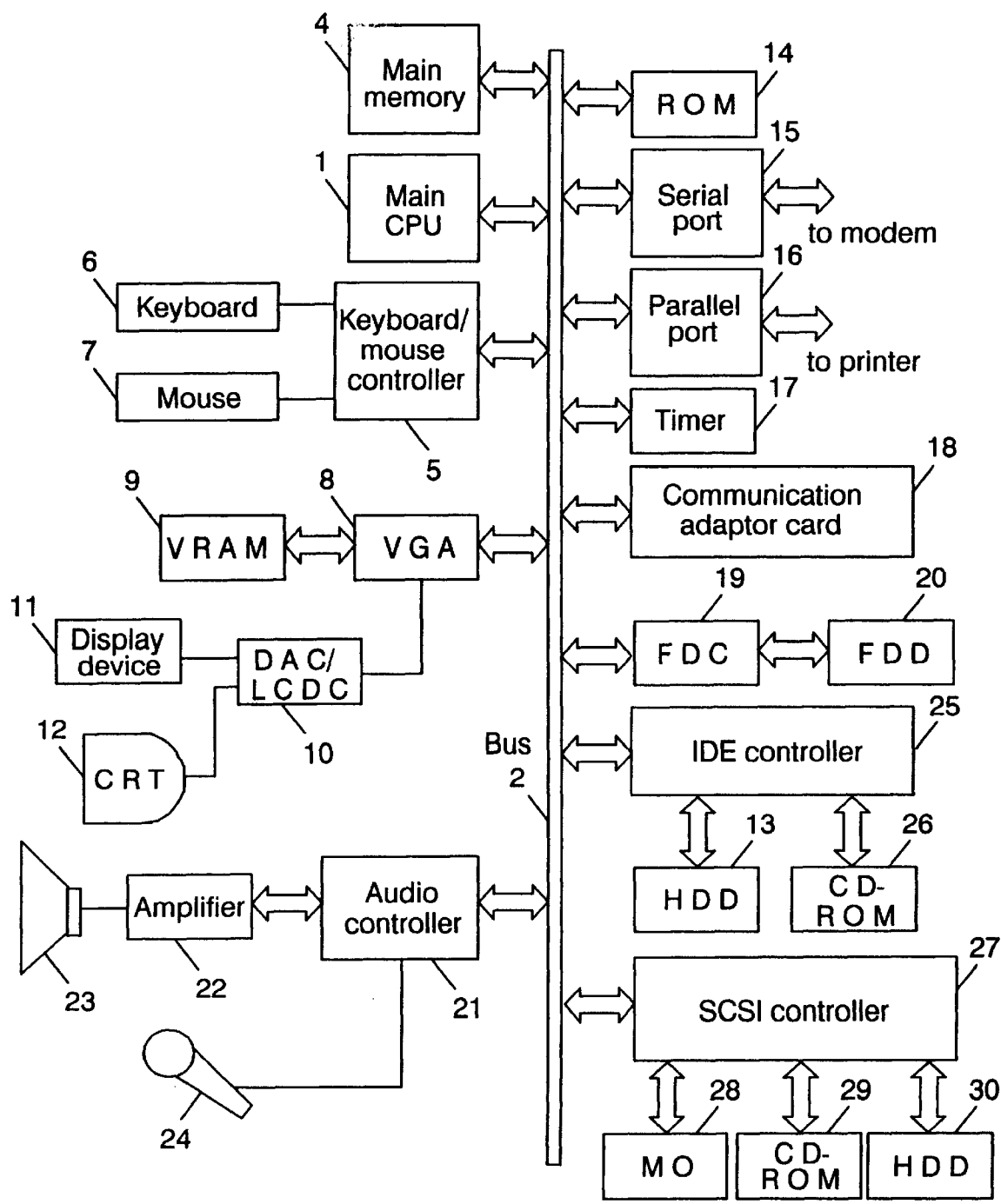
FIG. 1 is a block diagram illustrating an example hardware arrangement for a master controller or a slave server according to the present invention.

The preferred embodiment of the present invention will now be described while referring to the accompanying drawings. FIG. 1 is a schematic diagram illustrating the hardware arrangement of a remote control machine (master controller) according to one embodiment of the present invention. A master controller 100 includes a central processing unit (CPU) 1 and a memory 4. The CPU 1 and the memory 4 are connected via a bus 2 to a hard disk drive 13 that acts as an auxiliary storage device. A floppy disk drive (or a memory medium driver for an MO or CD-ROM) 20 is connected to the bus 2 via a floppy disk controller 19.

A floppy disk (or a memory medium such as an MO or a CD-ROM) is inserted into the floppy disk drive 20. Code for a computer program that interacts with an operating system and issues commands to the CPU 1 to implement the present invention can be recorded on the floppy disk or on the hard disk drive 13, or in the ROM 14. The computer program is executed by loading it into the memory 4. The computer program code can be compressed, or divided into several segments, and stored in a plurality of memory mediums.

The master controller 100 also includes user interface hardware, such as a pointing device (a mouse or a joystick) 7 or a keyboard 6 for input and a display 12 for providing visual data to a user. In addition, a printer can be connected via a parallel port 16 and a modem can be connected via a serial port 15. The master controller 100 can be connected to a network via the serial port 15 and the modem or a communication adaptor (an Ethernet or Token Ring card) 18 to communicate with another computer.

A sound signal obtained by D/A (digital/analog) conversion performed by an audio controller 21 is transmitted through an amplifier 22 and is output as sound through a loudspeaker 23. The audio controller 21 performs A/D (analog/digital) conversion of sound information received via a microphone 24 to fetch sound information from outside the system.

It can easily be understood that the master controller 100 of the present invention may be a common personal computer (PC), a workstation, a notebook PC, a palmtop PC, a network computer, an electric home appliance incorporating a computer, a game machine having a communication function, or a communication terminal having a communication function, such as a telephone, a facsimile machine, a portable telephone or an electronic notebook, or it may be constituted by a combination of these devices. The components in FIG. 1 are only examples, and not all of them are required for the present invention.

It would be obvious to one having ordinary skill in the art that various modifications of the arrangement for the master controller 100 are possible, e.g., the combining of a plurality of machines and the distribution of functions among them. These modifications are included in the concept of the present invention.

In addition to the master controller 100, a slave server 240 can be provided using the hardware arrangement shown in FIG. 1. More specifically, the slave server 240 need only have a function for receiving and converting an event into a drawing command and for sending the command, and a function for storing the software. Therefore, it can easily be understood that the slave server 240 may be a common personal computer (PC), a workstation, a notebook PC, a palmtop PC, an electric home appliance incorporating a computer, a game machine having a communication function, or a communication terminal having a communication function, such as a telephone, a facsimile machine, a portable telephone or an electronic notebook, or by a combination of any of these devices.

It should be noted that not all the components in FIG. 1 are required for the present invention. Particularly since the above described hardware arrangement is required for operating a remotely controlled server (slave server), the audio controller 21, the amplifier 22, the loudspeaker 23 and the microphone 24, which are used for sound processing, are not necessarily required. In addition, the keyboard 6, the mouse 7 and the keyboard/mouse controller 5, with which direct input by an operator is possible, are not always required for the remote controlled server.

An operating system for the master controller 100 can be: one supporting a GUI multi-window environment as standard, such as WINDOWS/NT (trademark of Microsoft Corp.), WINDOWS95 (trademark of Microsoft Corp.), WINDOWS 3.X (trademark of Microsoft Corp.), OS/2 (trademark of IBM Corp.), MACOS (trademark of Apple Inc.) or the X-WINDOW system (trademark of MIT) on AIX (trademark of IBM); one having a character based environment, such as PC-DOS (trademark of IBM Corp.) or MS-DOS (trademark of Microsoft Corp.); or an OS installed in a network computer, for example, a real time OS such as OS/OPEN (trademark of IBM Corp.) or VXWORKS (trademark of Wind River Systems, Inc.), or JAVAOS. In other words, the operating system for the master controller 100 is not limited to a specific operating system environment.

For one mode of the present invention where remote controlling software is downloaded using a web browser, an arbitrary web browser can be employed such as NETSCAPE NAVIGATOR (trademark of Netscape Corp.), INTERNET EXPLORER (trademark of Microsoft Corp.) or HOT JAVA (trademark of Sun Microsystems Corp.), so long as a Java applet can be used.

The operating system on the slave server 240 can also be: one supporting a GUI multi-window environment as standard, such as WINDOWSNT (trademark of Microsoft Corp.), WINDOWS95 (trademark of Microsoft Corp.), WINDOWS 3.X (trademark of Microsoft Corp.), OS/2 (trademark of IBM Corp.), MACOS (trademark of Apple Inc.) or the X-WINDOW system (trademark of MIT) on AIX (trademark of IBM); or an OS installed in a network computer, for example, a real time OS such as OS/OPEN (trademark of IBM Corp.) or VXWorks (trademark of Wind River Systems, Inc.), or JAVAOS. In other words, the operating system for the slave server 240 is not limited to a specific operating system environment.

B. System Configuration

The system configuration of the preferred embodiment of the present invention will now be described with reference to FIG. 3. In this embodiment, a web browser 213 of a master controller 210 works with a Java virtual machine 211. The web browser 213 accesses the slave server 240 in response to the entry of a URL by an operator (the physical input of a URL (Uniform Resource Locator) or the selection of a URL by pointing at a book mark).

When the slave server 240 is accessed by the master controller 210, an HTTP (Hypertext Transfer Protocol) daemon 241 accesses an HTML file 243 corresponding to the designated URL, and sends it to the master controller 210. The HTTP daemon 241 is a program that provides a service for a client that is accessing the server. As is shown in FIG. 5, the HTML file 243 contains information 271 linking it to a master applet 245, which is remote controlling software, so that the master applet 245 is sent to the master controller 210.

In the present invention, since an industrial standard Internet browser is employed to download the remote controlling software, the remote controlling does not depend on the platform of a remote control terminal. The HTML file 243 may include link information for a plurality of master applets 245 that exist in different servers or in the same server. In this case, the GUIs for a plurality of remotely controlled servers are displayed on the web browser. However, since the web browser can switch applications to send an event in accordance with the position of a pointer, a plurality of servers can be remotely controlled by one browser. In addition, a plurality of browsers at the master controller 210 are activated to remotely control a plurality of servers.

Figure 4:
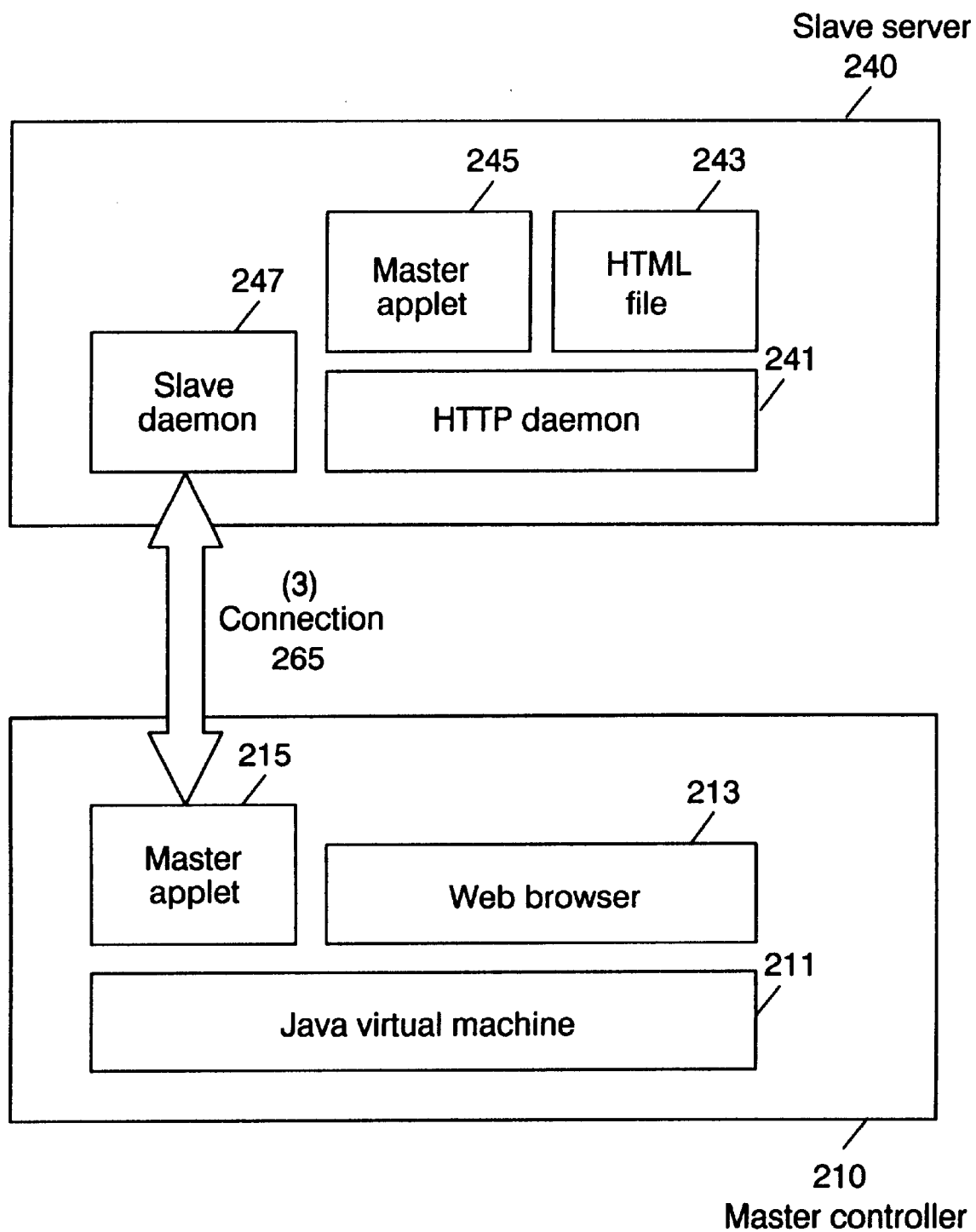
FIG. 4 is a block diagram illustrating arrangements of the master controller and the slave server according to an embodiment of the present invention.

When a master applet 215 is downloaded to the master controller 210, it is automatically activated and sends a connection request to a slave daemon 247 at the slave server 240. Upon receipt of the connection request, the slave daemon 247 notifies the master applet 215 at the master controller 210 that the connection is enabled. FIG. 4 is a diagram showing the condition where the slave daemon 247 of the slave server 240 has established a connection.

Figure 3:
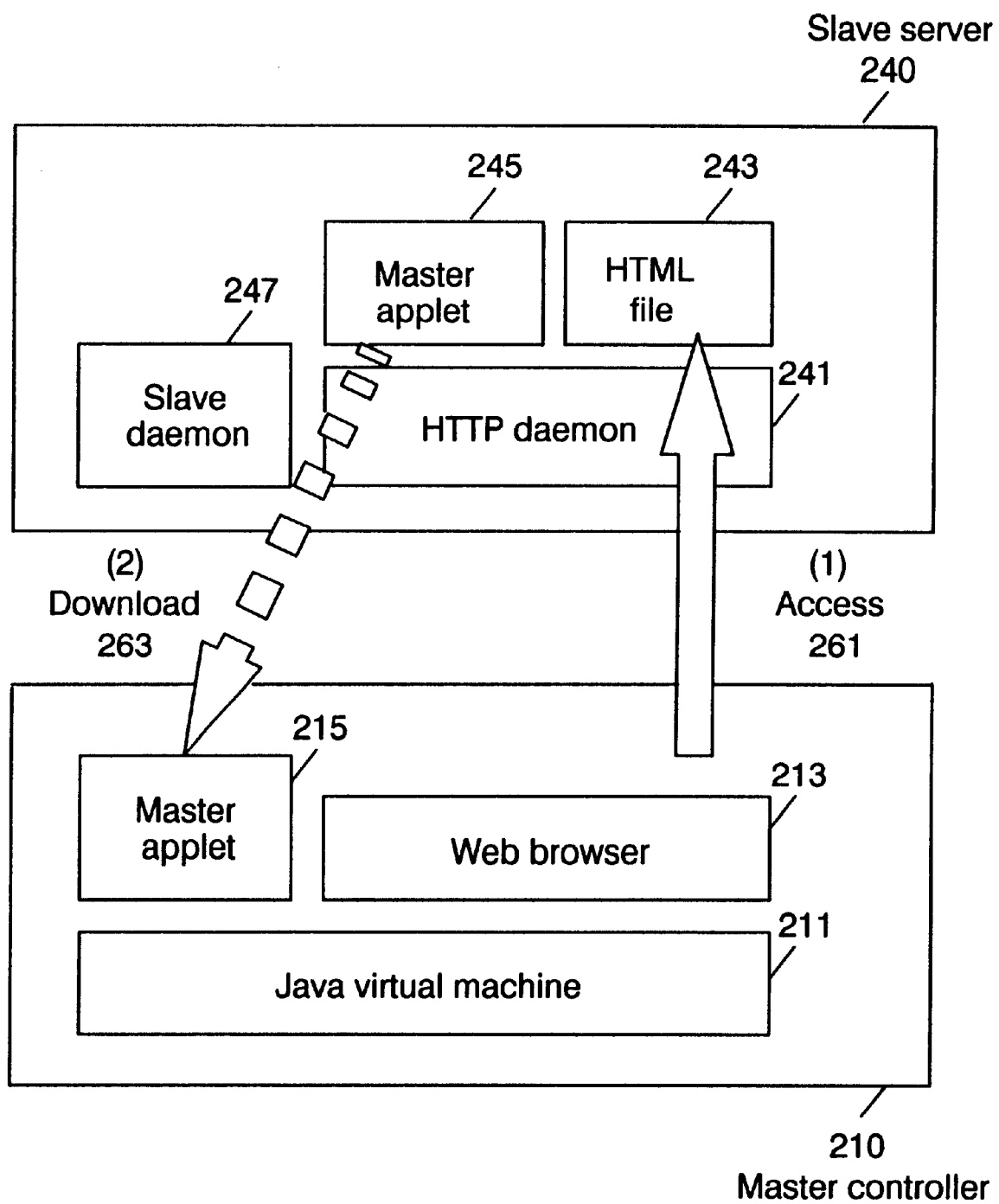
FIG. 3 is a block diagram illustrating the arrangements of a master controller and a slave server according to one embodiment of the present invention.

Although an explanation for all the functional blocks in FIGS. 3 and 4 has been given, these functional blocks are logical functional blocks, and as such are not specifically provided by a hardware set or a software set, but can be provided by a compound hardware and software set, or by a hardware and a software set functioning in common. Furthermore, not all of the functional blocks in FIGS. 3 and 4 are always required for the present invention. When the present invention employs a method for downloading software that does not include the use of a web browser, the Java virtual machine 211 and the web browser 213 can be replaced by other software that requests the remote controlling software. In addition, at the slave server 240, the HTML file 243 is also not absolutely required; the HTTP daemon 241 can be replaced by software that, in response to a request from the master controller 210, sends the remote controlling software to the master controller 210.

The processing for establishing a connection between remote controlling software and remotely controlled software and for preparing to perform the remote controlling function will now be explained with reference to the flowcharts in FIGS. 6 and 7, and the conceptual diagram showing the operating states of the master applet 215 and the slave daemon 247 in FIG. 8.

Figure 6:
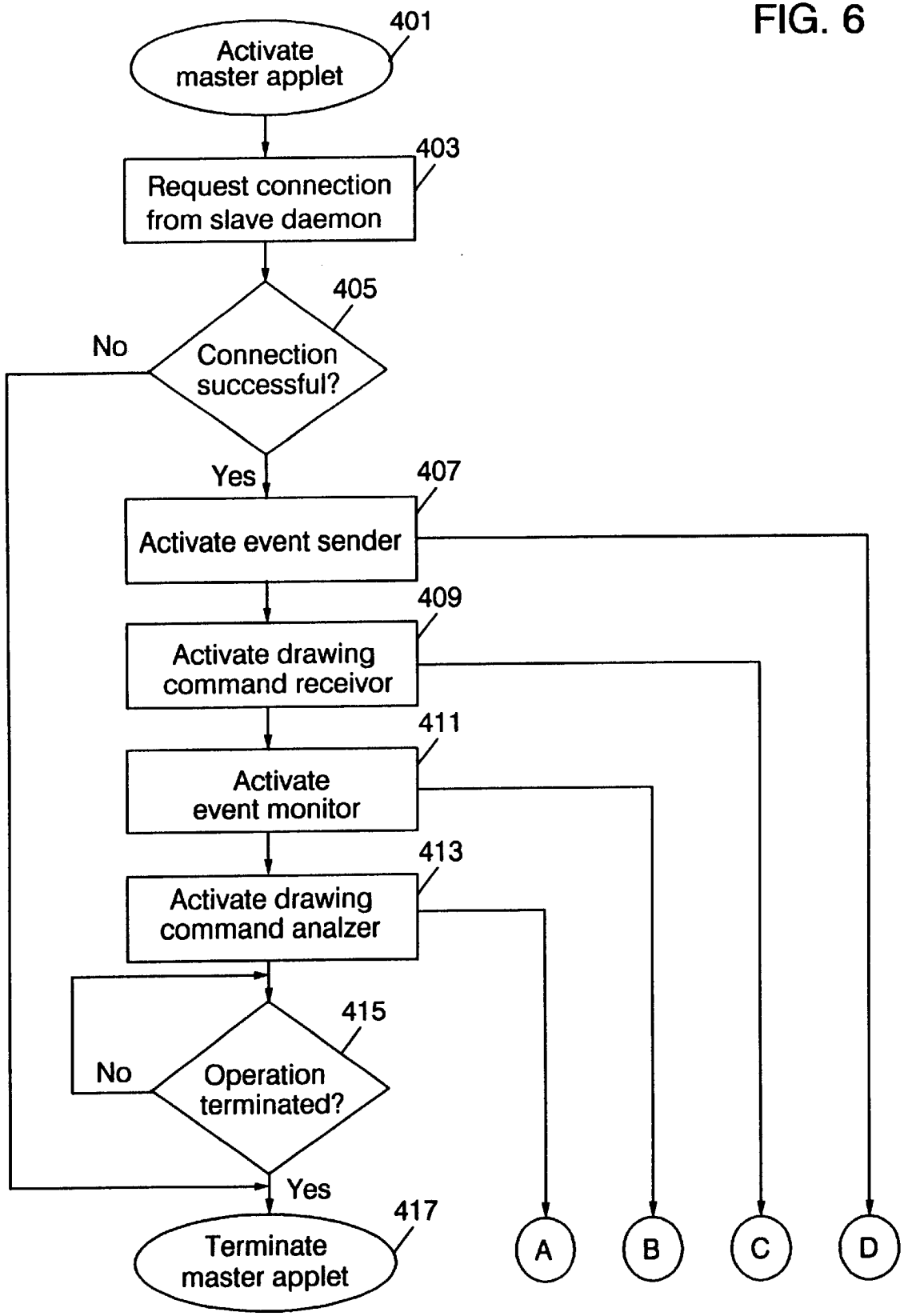
FIG. 6 is a flowchart showing the operating state of a master applet according to an embodiment of the present invention.

First, in FIG. 6, when the master applet 215 is downloaded to the master controller 210, the master applet 215 is automatically activated (block 401). After being activated, the master applet 215 issues a connection request to the slave daemon 247.

Figure 7:
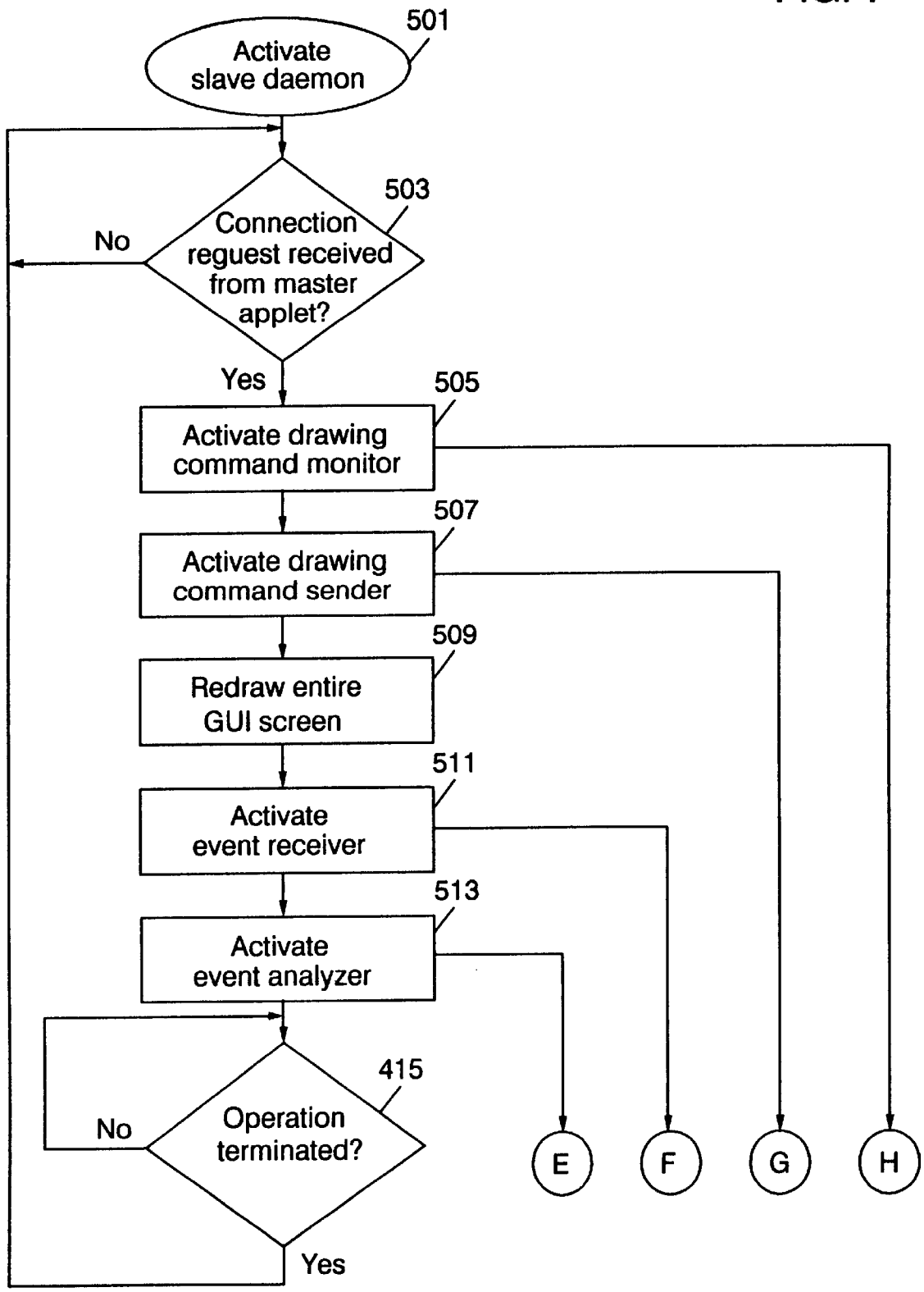
FIG. 7 is a flowchart showing the operating state of a slave daemon according to an embodiment of the present invention.
Figure 8:
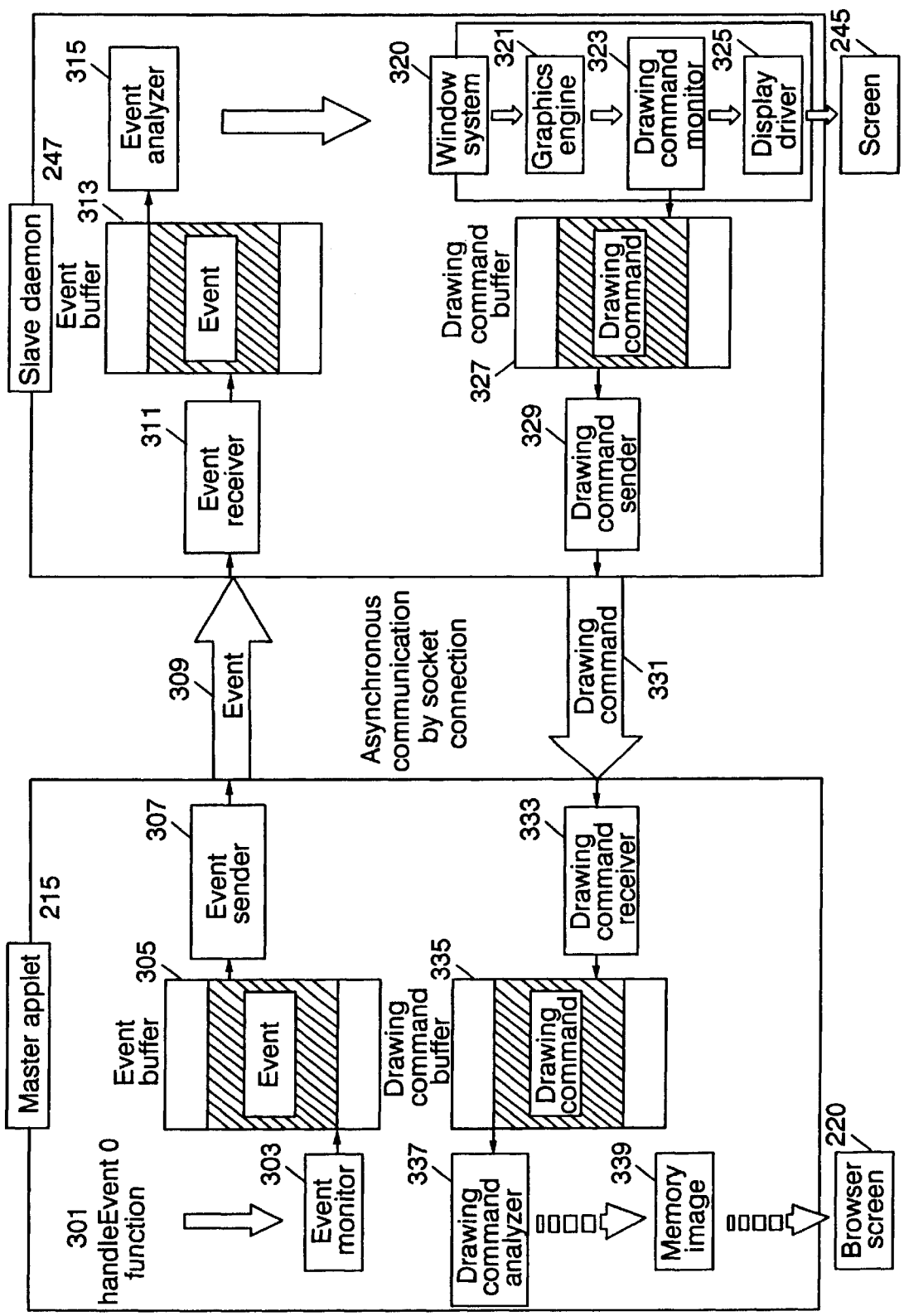
FIG. 8 is a conceptual diagram showing the operating states of the master applet and the slave daemon according to an embodiment of the present invention.

In FIG. 7, at this time, the slave daemon 247 at the slave server 240, which was rendered active in advance (block 501), monitors signal sending for a connection request issued by the master applet 215 (block 503). When the connection request from the master applet 215 is detected, the slave daemon 247 notifies the master applet 215 that the connection is enabled, activates a drawing command monitor 323 and a drawing command sender 329 (blocks 505 and 507), and redraws the GUI screen (block 509). FIG. 8 is a conceptual diagram showing the operating states of the master applet and the slave daemon according to an embodiment of the present invention.

The GUI screen is entirely redrawn because the current GUI screen of the slave server 240 is sent to the master controller 210. Following this action, an event receiver 311 and an event analyzer 315 are activated. In the embodiment of the present invention, threads are allocated individually to the drawing command monitor 323, the drawing command sender 329, the event receiver 311 and the event analyzer 315 to enable parallel operation.

Upon receipt of the connection enable notice from the slave server 240, the master applet 215 assumes that the connection is successful (block 405 in FIG. 6), and activates an event sender 307, a drawing command receiver 333, an event monitor 303 and a drawing command analyzer 337 (blocks 407, 409, 411 and 413). In this embodiment, as well as being allocated for the slave daemon 247, threads are allocated individually for the event sender 307, the drawing command receiver 333, the event monitor 303 and the drawing command analyzer 337 to enable parallel operation.

Figure 9:
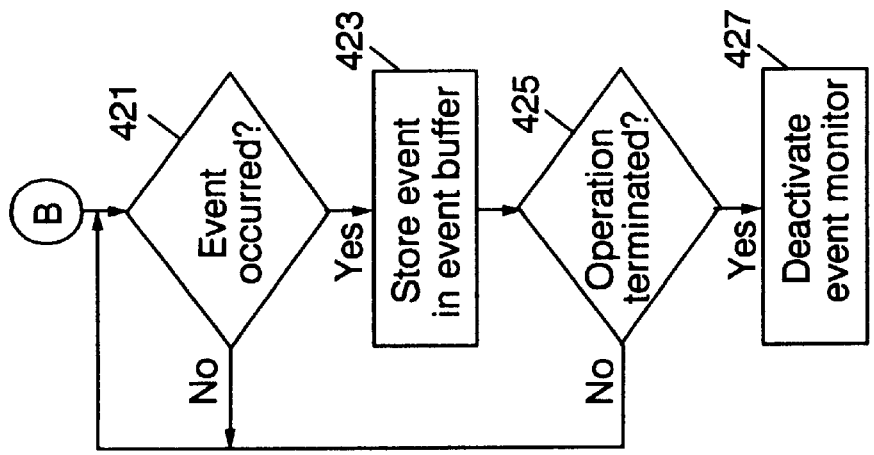
FIG. 9 is a flowchart of the processing performed by an event monitor according to an embodiment of an present invention.

The remote controlling processing in this embodiment will now be described with reference to FIGS. 9 through 16 and to the operating states of the master applet 215 and the slave daemon 247 in FIG. 8. FIG. 9 is a flowchart showing the processing for the event monitor 303. The event monitor 303 monitors events at the master applet 215 of the master controller 210 that occur when an input device, such as a mouse or a keyboard, is operated (block 421).

Figure 17:
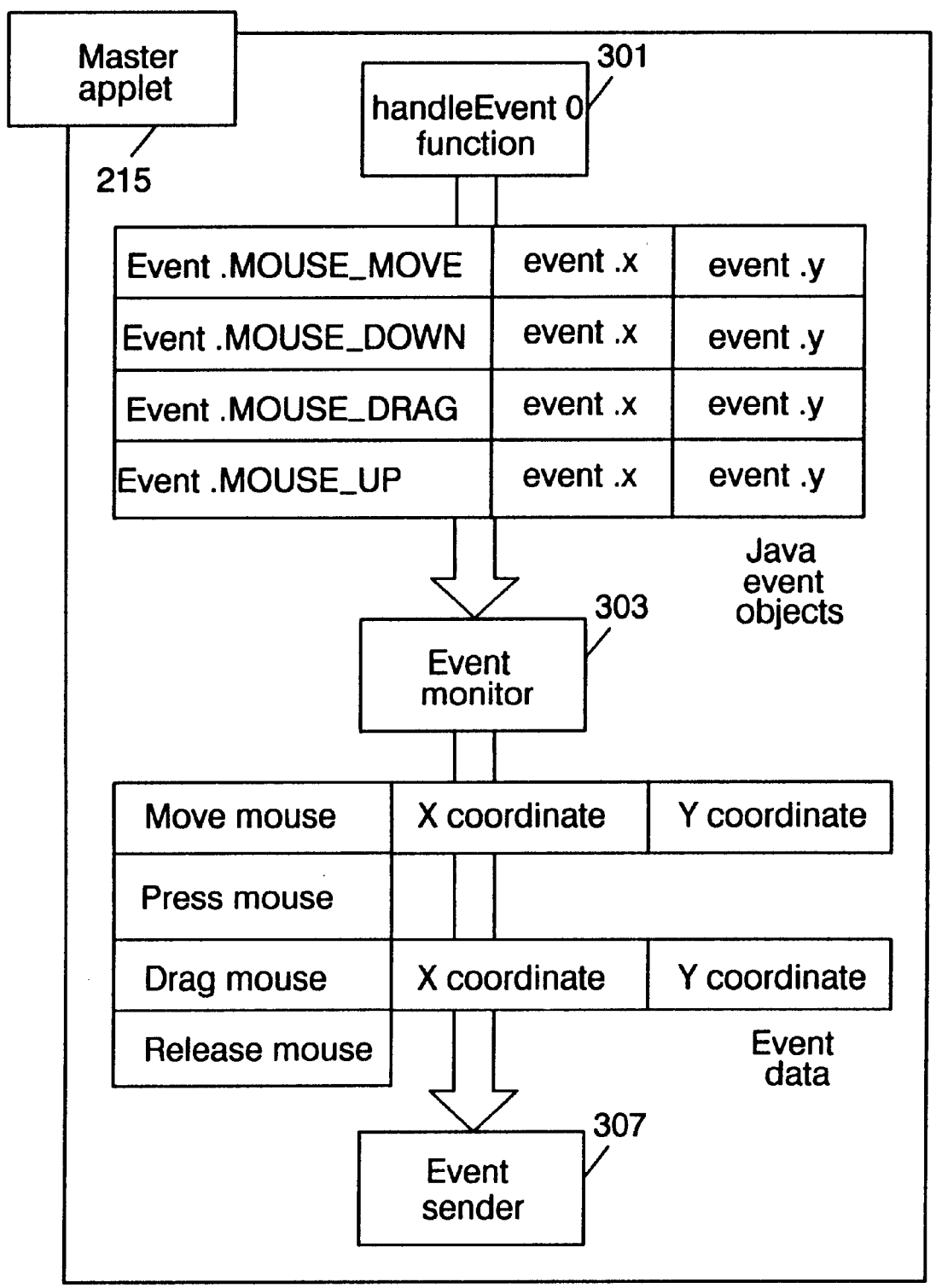
FIG. 17 is a diagram showing example data conversion performed by the event monitor according to an embodiment of the present invention.

In the preferred embodiment of the present invention, as is shown in FIG. 17, a signal for operating an input device, such as a mouse or a keyboard, is input as an event type, a coordinate value for the event, and a key number to the event monitor 303 by using a handleEvent function 301. In this embodiment, when the slave daemon 247 is activated, the GUI screen of the slave server 240 is re-drawn (block 509 in FIG. 7), and the current GUI screen is sent as a drawing command to the master controller 210.

Figure 2:
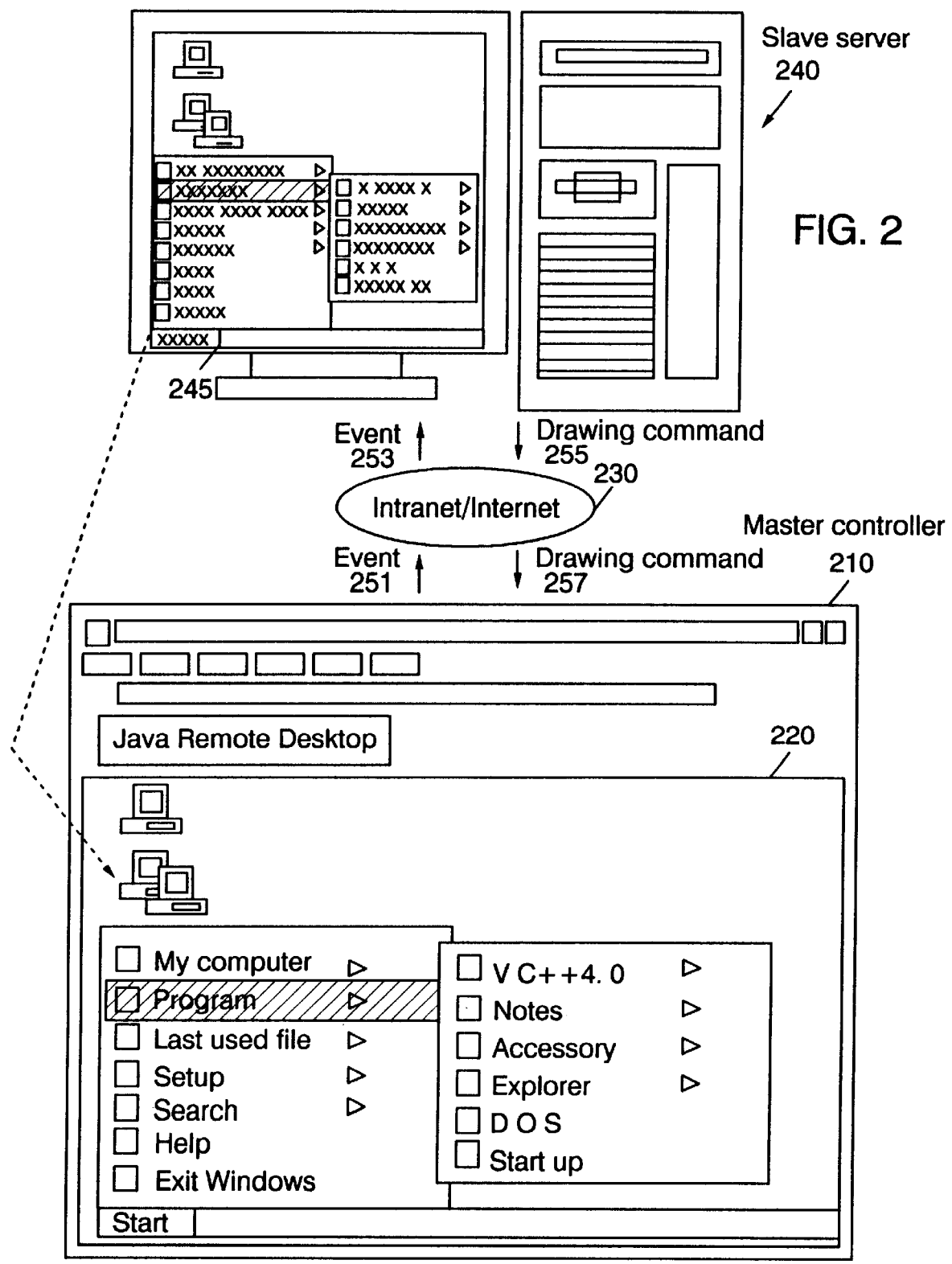
FIG. 2 is a diagram showing an example operating state of the present invention.

Upon receipt of the drawing command, the master controller 210 allocates a predetermined area to the GUI screen that is based on the sent drawing command. The event monitor 303 monitors user input to the allocated area (a slave server display area 220 in FIG. 2). The operator can perform remote controlling not only by using a pointing device, such as a mouse, to input data to the slave server display area 220, but also by using keyboard input and sound input while the slave server display area 220 is focussed.

In this embodiment, to reduce the quantity of the data that is sent to the slave daemon 247, the event monitor 303 converts the data into signals that provide the minimum information necessary for the slave daemon 247 to generate a window message, which will be described later. It is also possible that the converted data is further compressed or encoded and that the resultant data is sent to the slave daemon 247, which decompresses the data.

The data conversion performed by the event monitor 303 is not an indispensable process, and event data that are generated by handleEvent function 301 may be sent unchanged to the slave daemon 247. FIG. 18 is a diagram showing common event data examples that are obtained by conversion in this embodiment.

Since the event monitor 303 and the event sender 307 can be independently operated, an event provided by conversion is stored temporarily in an event buffer 305 (block 423). As the event buffer 305 will also become unnecessary if each time an event occurs it is sent directly to the slave daemon 247, the event buffer 305 is not a requisite component for the present invention. The processing is continued until the operation is terminated (block 425). When it is ascertained that the operation has been terminated, the event monitor 303 is deactivated (block 427).

Figure 10:
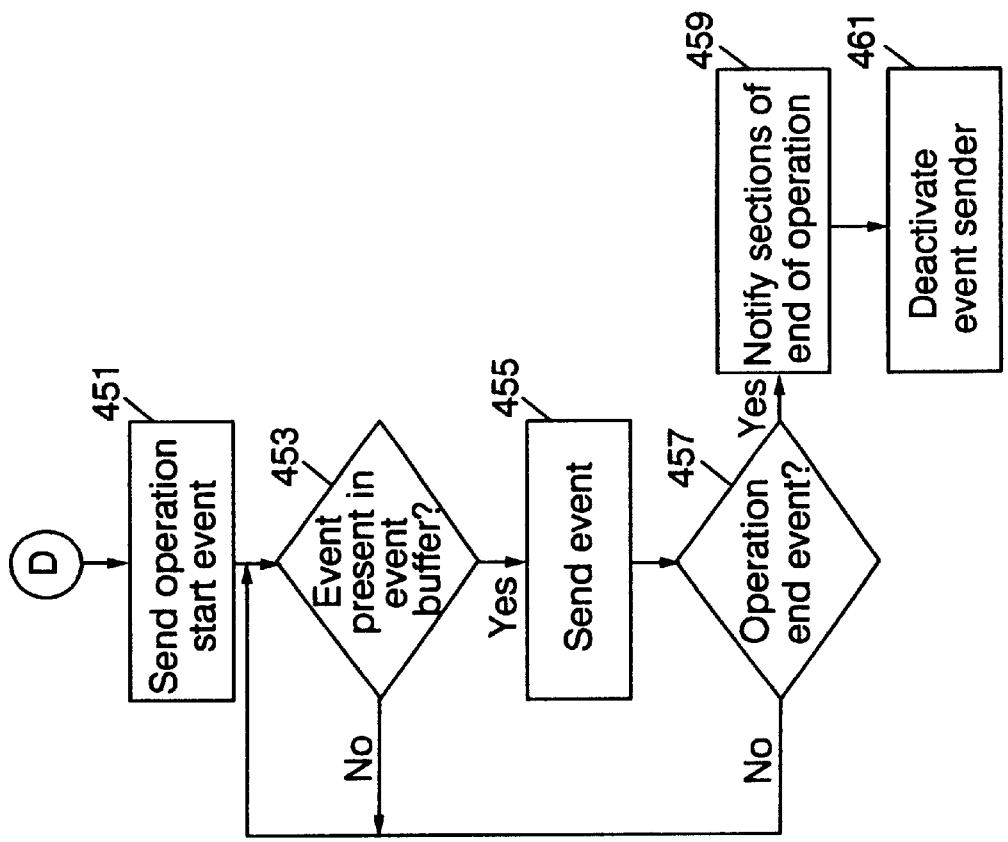
FIG. 10 is a flowchart of the processing performed by an event sender according to an embodiment of the present invention.

On the other hand, as is shown in FIG. 10, when the event sender 307 is activated, an operation start event is sent to the slave daemon 247 (block 451). Then, a check is performed to determine whether or not an event is stored in the event buffer 305 (block 453). When an event is stored in the event buffer 305, it is sent to the slave daemon 247 (block 455). In addition to the event monitor 303, the event sender 307 continues the performance of the processing until the operation is terminated (block 457). When the termination of the operation is detected, a signal to that effect is sent to the respective sections (block 459), and the event sender 307 is deactivated (block 461).

Figure 11:
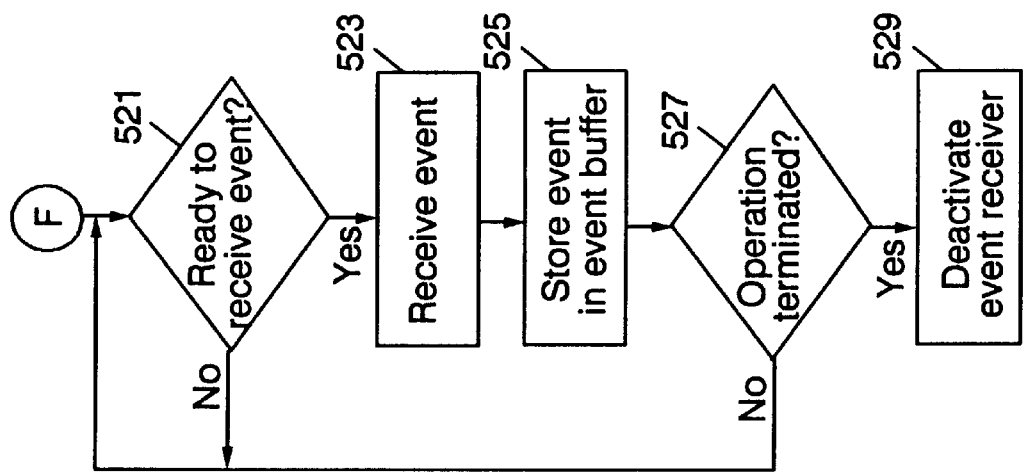
FIG. 11 is a flowchart of the processing performed by an event receiver according to an embodiment of the present invention.

FIG. 11 is a flowchart showing the processing performed by the event receiver 311. When the event receiver 311 receives an operation start event from the master applet 215, it ascertains whether acceptance of the event is possible (block 521). When the event receiver 311 accepts the event from the master applet 215 (block 523), it stores the event in an event buffer 313 for the slave daemon 247 (block 525). At the event receiver 311, this process is repeated until the operation is terminated (block 527). When the termination of the operation is detected, the event receiver 311 is deactivated (block 529).

Figure 12:
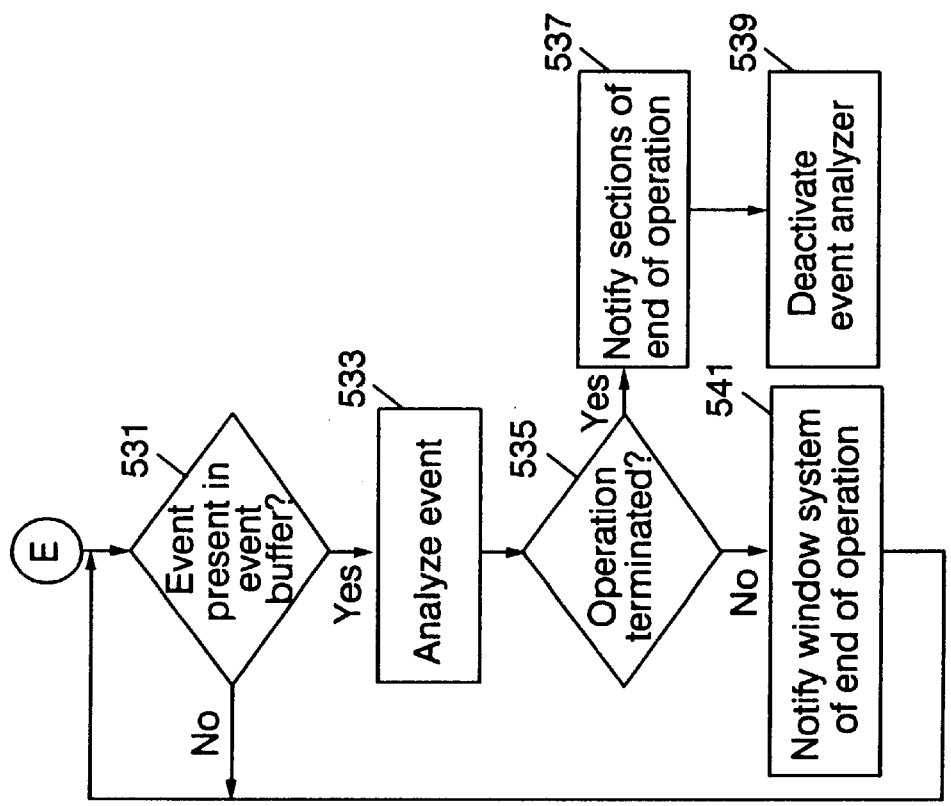
FIG. 12 is a flowchart of the processing performed by an event analyzer according to an embodiment of the present invention.
Figure 19:
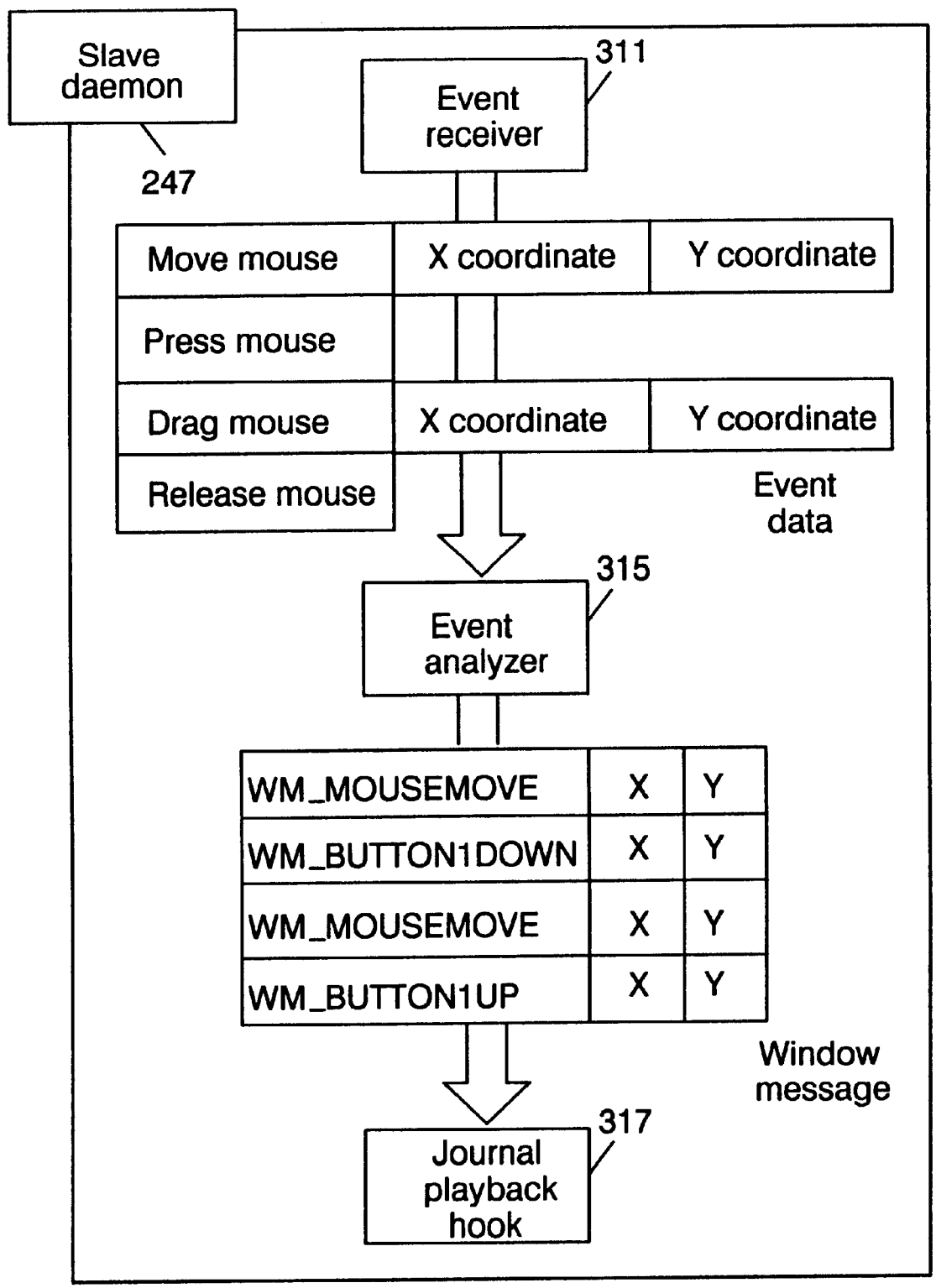
FIG. 19 is a diagram showing example data conversion performed by the event analyzer according to an embodiment of the present invention.

As is shown in FIG. 12, the event analyzer 315 monitors the storing of an event in the event buffer 313 (block 531), and analyzes the event stored in the event buffer 313 (block 533). In this embodiment, as is shown in FIG. 19, the event analyzer 315 analyzes the received event, converts it into a window message having a form that is compatible with a window system 320, which works on the slave server 240, and transmits the message via a journal playback hook 317 to the window system 320 (block 541).

The journal playback hook 317 is generally paired with a journal record hook when it is used. The journal record hook can record a window message input by the operator, and the journal playback hook 317 can reproduce the recorded window message.

In this embodiment, the function of the journal playback hook 317 is employed. The window message generated by the event analyzer 315 is sent to the journal playback hook procedure 317, and the window system 320 can handle it as a window message occurring in the window system 320. The window system 320 interprets the received window message, determines what is to be input to which application, and causes the GUI screen to be rewritten. The GUI screen that is rewritten in response to the window message is output as an image on a physical display device 245 to a Graphics engine 321 and a display driver 325 in the window system 320.

In the event analyzer 315, the above process is repeated until the operation is terminated (block 535). When the termination of the operation is detected, the event analyzer 315 forwards a signal to that effect to the respective sections (block 537). The event analyzer 315 is thereafter deactivated (block 539).

Figure 13:
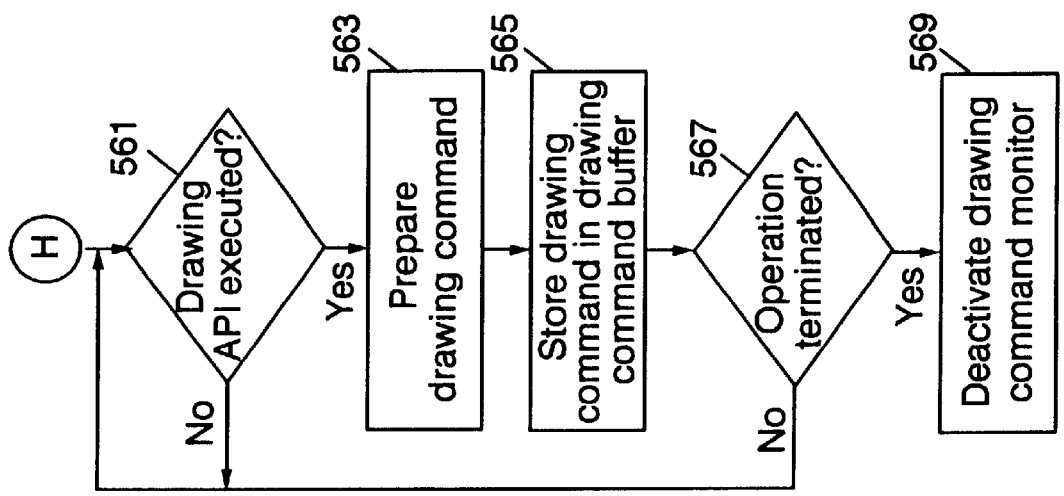
FIG. 13 is a flowchart of the processing performed by a drawing command monitor according to an embodiment of the present invention.

FIG. 13 is a flowchart showing the processing performed by the drawing command monitor 323. The drawing command monitor 323 is situated between the Graphics engine 321 and the display driver 325 of the window system 320, and can act as the display driver 325 with respect to the Graphics engine 321, while acting as the Graphics engine 321 with respect to the display driver 325.

The drawing command monitor 323, which is located between the Graphics engine 321 and the display driver 325, monitors all the APIs that are called for rewriting the GUI screen at the slave server 240, and prepares a drawing command based on the API (block 563). The drawing command is stored in a drawing command buffer 327 in the slave server 240 (block 565). FIG. 20 is a diagram showing example data for a typical drawing command in this embodiment.

It is possible for a converted drawing command to be further compressed or encoded, and for the resultant command to be sent to the master applet 215, which thereafter decompresses it. The conversion performed by the drawing command monitor 323 is not essential, and data generated by the Graphics engine 321 and sent to the display driver 325 may be sent unchanged to the master applet 215.

Figure 14:
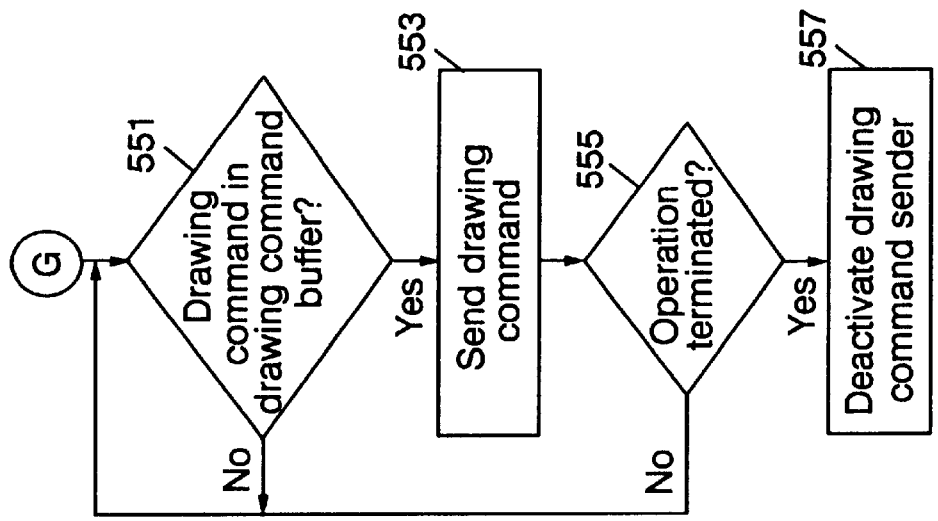
FIG. 14 is a flowchart of the processing performed by a drawing command sender according to an embodiment of the present invention.

FIG. 14 is a flowchart showing the processing performed by the drawing command sender 329. The drawing command sender 329 monitors the storing of drawing commands in the drawing command buffer 327 (block 551). When the drawing command sender 329 detects the storage of a drawing command in the drawing command buffer 327, it sends the drawing command to the master controller 210 (block 553). This process is repeated until the operation is terminated (block 555). When the termination of the operation is detected, the drawing command sender 329 is deactivated (block 557).

Figure 15:
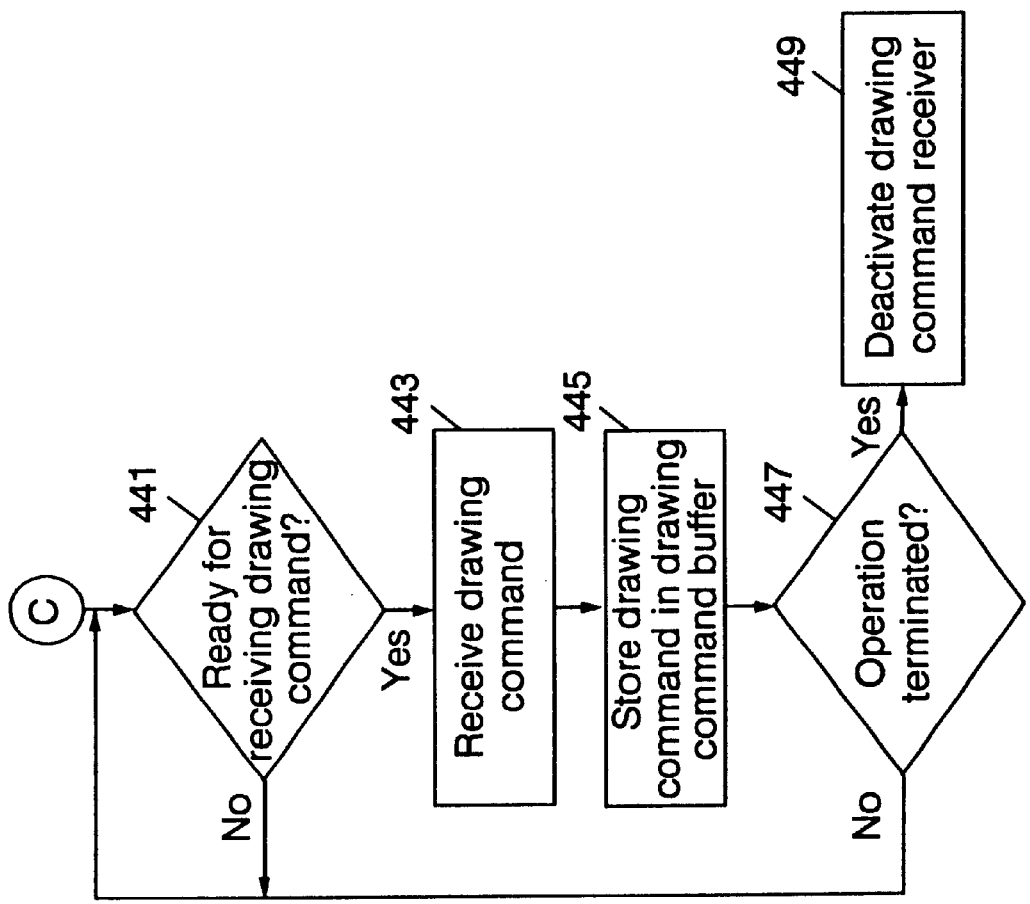
FIG. 15 is a flowchart of the processing performed by a drawing command receiver according to an embodiment of the present invention.

FIG. 15 is a flowchart showing the processing performed by the drawing command receiver 333. The drawing command receiver 333 monitors the sending of drawing commands from the slave daemon 247 (blocks 441 and 443), and stores received drawing commands in a drawing command buffer 335 in the master controller 210 (block 445). This processing is repeated by the drawing command receiver 333 until the operation is terminated (block 447). When the termination of the operation is detected, the drawing command receiver 333 is deactivated (block 449).

Figure 16:
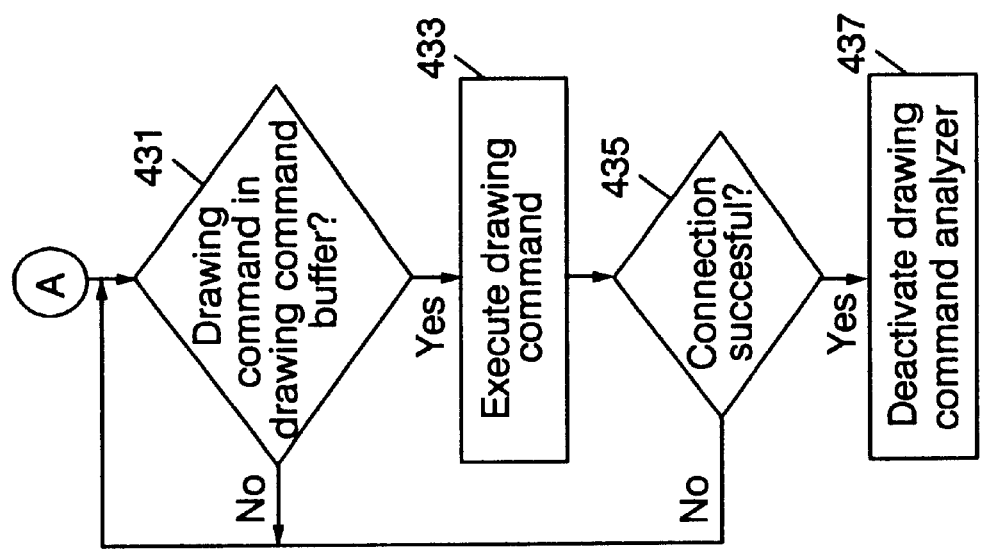
FIG. 16 is a flowchart of the processing performed by a drawing command analyzer according to an embodiment of the present invention.

FIG. 16 is a flowchart showing the processing performed by the drawing command analyzer 337. The drawing command analyzer 337 monitors the storing of drawing commands in the drawing command buffer 335 (block 431). The drawing command analyzer 337 analyzes the stored drawing commands to generate the same image as that drawn on the GUI screen of the slave server 240, and draws that image on the web browser screen 220 of the master controller 210 (block 433). The above process is repeated by the drawing command analyzer 337 until the operation is terminated (block 435). when the termination of the operation is detected, the drawing command analyzer 337 is deactivated (block 437).

As is described above, according to the present invention, provided is a computer system wherein, even when no remote controlling software is currently available at a remote control terminal, remote controlling of a server can be effected simply by accessing it.

Further, according to the present invention, it is possible to simplify the upgrading operation, for remote controlling software held by a remote control terminal, that accompanies the upgrading of the version of the remote controlling software held by a server that is to be remotely controlled. In addition, according to the present invention, it is possible to eliminate the installation of remote controlling software that is conventionally required for a remote control terminal and to reduce the load imposed on a system manager. Furthermore, according to the present invention, it is possible to eliminate the management of remote controlling software that is conventionally required for a remote control terminal and to reduce the load imposed on a system manager. Moreover, according to the present invention, it is possible to enable a remote controlling operation that is not dependent on the platform provided for a remote control terminal. Further, according to the present invention, it is possible to reduce the use of resources by a remote control terminal and to reduce the requirements for the hardware that can be used for a remote control terminal. In addition, according to the present invention, provided is a fast remote controlling system that reduces the quantity of data that is exchanged by a remote controlling machine and a remotely controlled machine during a remote controlling operation. Furthermore, according to the present invention, it is possible to reduce the memory area of a remote control terminal and the load on a resource, such as a CPU, by employing software used for one application as special download software for downloading remote controlling software.

Although the present invention has been described with respect to a specific preferred embodiment thereof, various changes and modifications may be suggested to one skilled in the art, and it is intended that the present invention encompass such changes and modifications as fall within the scope of the appended claims.

What is claimed is:

1. A server connected to a network, comprising:

remotely controlled software which executes on the server, wherein the remotely controlled software comprises an input information receiving part, an input information analyzing part responsive to the input information receiving part for providing input information to an operating system of the server, a drawing command monitoring part responsive to the generation of graphics for a graphic user interface desktop at the server and a drawing command sending part responsive to the drawing command monitoring part;

remotely controlling software configured to interact with said remotely controlled software, said remotely controlling software including an input information monitoring part, an input information sending part responsive to the input information monitoring part, a drawing command receiving part and a drawing command analyzing part responsive to the drawing command receiving part for generating graphics corresponding to the graphics for the graphic user interface desktop at the server;

an HTML file holding a description of procedures for accessing said remote controlling software; and an HTTP daemon for controlling access to said HTML file from said network.

2. A computer system which includes a server connected to a network and a terminal connected to a network, comprising:

remotely controlled software executing on the server, wherein the remotely controlled software comprises an input information receiving part, an input information analyzing part responsive to the input information receiving part for providing input information to an operating system of the server, a drawing command monitoring part responsive to the generation of graphics for a graphic user interface desktop at the server and a drawing command sending part responsive to the drawing command monitoring part;

remotely controlling software configured to interact with said remotely controlled software, said remotely controlling software including an input information monitoring part, an input information sending part responsive to the input information monitoring part, a drawing command receiving part and a drawing command analyzing part responsive to the drawing command receiving part for generating graphics corresponding to the graphics for the graphic user interface desktop at the server;

an HTML file holding a description of procedures for accessing said remote controlling software;

an HTTP daemon for controlling access to said HTML file from said network;

a web browser for accessing said HTML file to download said remote controlling software to the terminal; and means for storing said remote controlling software.

3. A method of remotely controlling a server having a graphic user interface, the method comprising:

accessing the server via a remote terminal utilizing server access information specified by the terminal;

transmitting a master remote control program from the server to the terminal in response to server being accessed utilizing the server access information;

establishing a connection between the master remote control program at the terminal and a slave remote control program associated with the graphic user interface of the server;

obtaining input at the master remote control program corresponding to input to the graphic user interface of the server so as to provide input information;

sending the input information from the master remote control program at the terminal to the slave remote control program;

receiving the sent input information at the slave remote control program associated with the graphic user interface of the server;

generating graphic user interface (GUI) display information at the server utilizing the graphic user interface of the server by the slave remote control program providing input to the graphic user interface of the server to control the graphic user interface of the server in response to receiving the input information at the slave remote control program so as to generate drawing commands for a desktop image corresponding to the graphic user interface of the server;

transmitting the drawing commands from the slave remote control program to the master remote control program;

receiving the drawing commands at the master remote control program; and generating the GUI display information at the remote terminal utilizing the received drawing commands so as to provide a GUI display desktop at the remote terminal corresponding to the desktop image of the graphic user interface at the server responsive to drawing commands received by the master remote control program.

4. A method according to claim 3, wherein the terminal comprises a web browser and wherein the step of accessing the server via a remote terminal utilizing server access information comprises the step of transmitting a Universal Resource Locator to the server specifying a hyper-text markup language (HTML) document associated with the resource of the server to be remotely controlled.

5. A method according to claim 4, wherein the master control program comprises a JAVA applet executed by a JAVA virtual machine residing at the terminal.

6. A system for remotely controlling a server having a graphic user interface, comprising:

means for accessing the server via a remote terminal utilizing server access information specified by the terminal;

means for transmitting a master remote control program from the server to the terminal in response to server being accessed utilizing the server access information;

means for establishing a connection between the between the master remote control program at the terminal and a slave remote control program associated with the graphic user interface of the server;

means for obtaining input at the master remote control program corresponding to input to the graphic user interface of the server so as to provide input information;

means for sending the input information from the master remote control program at the terminal to the slave remote control program;

means for receiving the sent input information at the slave remote control program associated with the graphic user interface of the server;

means for generating graphic user interface (GUI) display information at the server utilizing the graphic user interface of the server by the slave remote control program providing input to the graphic user interface of the server to control the graphic user interface of the server in response to receiving the input information at the slave remote control program so as to generate drawing commands for a desktop image corresponding to the graphic user interface of the server;

means for transmitting the drawing commands from the slave remote control program to the master remote control program;

means for receiving the drawing commands at the master remote control program; and means for generating the GUI display information at the remote terminal utilizing the received drawing commands so as to provide a GUI display desktop at the remote terminal corresponding to the desktop image of the graphic user interface at the server responsive to drawing commands received by the master remote control program.

7. A system according to claim 6, wherein the terminal comprises a web browser and wherein the means for accessing the server via a remote terminal utilizing server access information comprises means for transmitting a Universal Resource Locator to the server specifying a hyper-text markup language (HTML) document associated with the resource of the server to be remotely controlled.

8. A computer program product stored in a computer readable medium for remotely controlling a server having a graphic user interface, comprising:

computer program code which accesses the server via a remote terminal utilizing server access information specified by the terminal;

computer program code which transmits a master remote control program from the server to the terminal in response to server being accessed utilizing the server access information;

computer program code which establishes a connection between the master remote control program at the terminal and a slave remote control program associated with the graphic user interface of the server;

computer program code which obtains input at the master remote control program corresponding to input to the resource of the server so as to provide input information;

computer program code which sends the input information from the master remote control program at the terminal to the slave remote control program;

computer program code which receives the sent input information at the slave remote control program associated with the graphic user interface of the server;

computer program code which generates graphic user interface (GUI) display information at the server utilizing the graphic user interface of the server by the slave remote control program providing input to the graphic user interface of the server to control the graphic user interface of the server in response to receiving the input information at the slave remote control program so as to generate drawing commands for a desktop image corresponding to the graphic user interface of the server;

computer program code which transmits the drawing commands from the slave remote control program to the master remote control program;

computer program code which receives the drawing commands at the master remote control program; and computer program code which generates the GUI display information at the remote terminal utilizing the received drawing commands so as to provide a GUI display desktop at the remote terminal corresponding to the desktop image of the graphic user interface at the server responsive to drawing commands received by the master remote control program.

9. A computer program product according to claim 8, wherein the terminal comprises a web browser and wherein the computer readable code which accesses the server via a remote terminal utilizing server access information comprises computer readable which which transmits a Universal Resource Locator to the server specifying a hyper-text markup language (HTML) document associated with the resource of the server to be remotely controlled.

\* \* \* \* \*